United States Patent Office 3,558,401
Patented Jan. 26, 1971

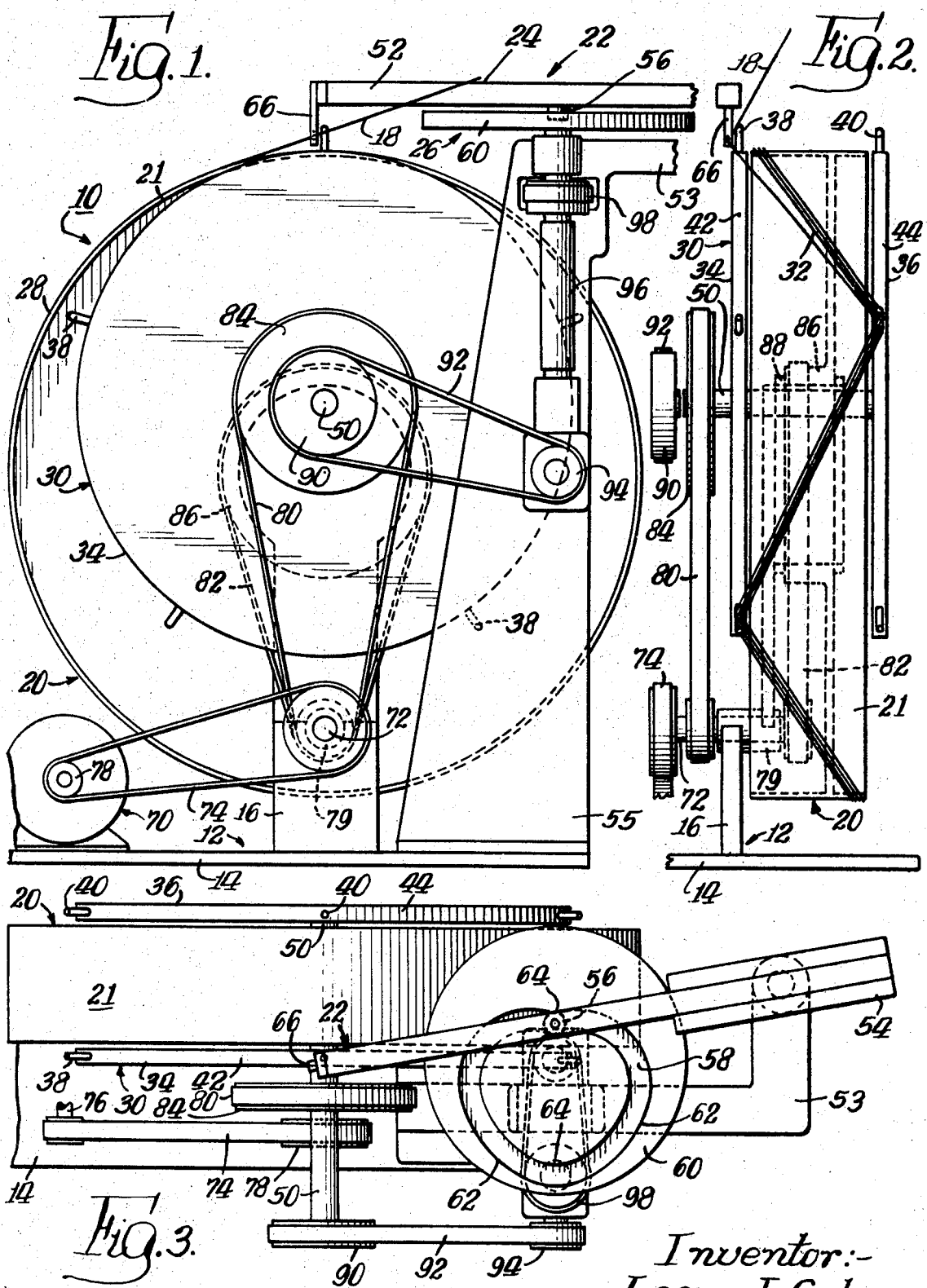

3,558,401
BREAKER WINDING MACHINE
Leon J. Cole, Niles, Mich., assignor to National-Standard Company, Niles, Mich., a corporation of Delaware
Filed Mar. 10, 1969, Ser. No. 805,439
Int. Cl. B29h 17/20
U.S. Cl. 156—397                                    4 Claims

ABSTRACT OF THE DISCLOSURE

A breaker winding machine for automatically winding a cord onto a rotating collapsible building drum by means of a traverse arm assembly that swings back and forth across the drum. Two circular pinwheel assemblies having equal diameters that are less than the drum's diameter mounted on either side of the drum on a common drive shaft, which is offset from the drum's axis such that its equally spaced pins ride above the peripheral surface of the drum for an arcuate segment during each revolution. The pinwheel assemblies being driven at a speed relative to the drum's rotation and operating in conjunction with the swinging action of the traverse arm to form the edge of the breakers.

BACKGROUND OF THE INVENTION

One of the most recent developments in the construction of a flexible ring-shaped structure or belt structure for incorporation into pneumatic tires for vehicle wheels of all types is to wind a thread or cord in a zig-zag fashion on a suitable form until a belt structure is formed. The flexible ring-shaped structure obtained by this procedure does not have any free ends of thread nor any joints between the threads lying in different layers or planes. Thus, each thread of the belt structure provides a direct connection between the tread and the carcass of the pneumatic tire and permits the reduction in the number of layers disposed between the tread and carcass without sacrificing tensile strength.

One method of forming the above-described breaker structure is to lay a thread or cord on the peripheral surface of a collapsible building drum in a zig-zag path of constant pitch and on each successive rotation of the drum to advance the laying of the cord by a small increment to form a series of close-spaced zig-zag lines, resulting in a continuous band structure. The problem encountered in employing this winding technique is designing a breaker winding machine that will advance the laying of the zig-zag line a small increment on each successive rotation of the building drum and will positively hold the thread in its proper position until it is stitched. the breaker winding machine of the present invention accomplishes this objective in a simple but unique manner.

SUMMARY OF THE INVENTION

This invention relates to a machine for forming an annular band or breaker structure for incorporation into pneumatic tires, and more particularly, to a machine for forming an annular band or breaker structure from an endless thread or cord.

Briefly, the breaker winding machine of this invention wraps an endless thread or cord onto a collapsible building drum in a zig-zag pattern wherein the cord positioning mechanism on each rotation of the drum advances the line being laid an incremental distance with respect to the previously laid line to provide a continuous series of closely spaced zig-zag lines until the peripheral surface of the drum is completely covered. A traverse arm is pivotally mounted above the drum's peripheral surface with an eye-hook projecting downwardly from its free end for feeding the cord or thread onto the drum. Two pinwheel assemblies having equal diameters that are less than the drum's diameter are mounted on either side of the building drum and cooperates with the swinging movement of the traverse arm across the drum's surface to provide the desired series of zig-zag lines.

The two pinwheel assemblies are rotated by a common drive shaft which is parallel to but offset from the drum's drive shaft. A plurality of equally spaced pins extend radially from each of the pinwheel's peripheral surface in a plane perpendicular to the common drive shaft's axis. The traverse arm is reciprocably driven by a cam drive mechanism across the drum's peripheral surface in an arcuate path to a point just beyond the plane formed by the pins.

The location of the drive shaft for the pin wheel assemblies is selected so that each pin for each rotation of the pinwheel assemblies will project above the drum's peripheral surface for a short segment which includes the point on the drum where the arcuate path traced by the feed hook intersects with the edge of the drum's peripheral surface. After the feed hook passes in front of the pin projecting above the drum's surface, the traverse arm reverses its direction to swing the feed hook behind this pin, causing the thread to wrap around the projecting pin to provide an edge for the breaker being formed by the successive series of zig-zag lines. To provide a successive series of zig-zag lines, it is necessary to rotate the two pinwheel assemblies at a higher angular velocity than the drum by a certain factor such that the laying of the cord will be advanced a small increment upon each rotation of the drum.

Accordingly, one of the objects of this invention is to provide an apparatus for forming an annular band or breaker of one continuous thread length by laying a series of continuous closely spaced zig-zag lines in a simple but unique manner.

A further object is to provide an apparatus for forming an annular band or breaker of one continuous thread length onto a rotating collapsible building drum by using two pinwheel assemblies that rotate at a selected higher speed relative to the drum and cooperate with a cord or thread feed mechanism to provide a continuous series of closely spaced zig-zag lines until a continuous band structure is formed.

A still further object of this invention is to provide an apparatus for forming an annular band or breaker of one continuous thread length onto a rotating collapsible building drum by using a cord or thread feed traverse arm that is reciprocally driven across the drum by a cam mechanism to form a straight, curved or Z-shaped line whose loops are engaged by a projecting pin of a pinwheel assembly to lay a continuous series of closely spaced zig-zag lines until a continuous band structure is formed.

DESCRIPTION OF THE DRAWINGS

For a better understanding of the present invention, reference may be had to the accompanying drawings in which:

FIG. 1 is a front elevational view of a new and improved breaker winding machine constructed in accordance with the features of the present invention;

FIG. 2 is a side elevational view of the breaker winding machine shown in FIG. 1; and FIG. 3 is a top plan view of the breaker winding machine depicted in FIG. 1.

DESCRIPTION OF THE PREFERRED EMBODIMENT

As illustrated in FIGS. 1 through 3, a breaker winding machine, generally indicated by reference numeral 10, is supported on a T-shaped frame 12, having a base member 14 and a vertical frame member 16. The breaker winding machine 10 is designed to produce an improved flexible ring-shaped or belt structure for incorporation into a pneumatic tire by winding a single thread or cord 18 on a collapsible building drum 20. As is conventional in the tire making art, the thread or cord 18 consists of a metal wire or cord that is covered with a compound formed from an uncured natural or synthetic rubber or any suitable plastic material. The thread or cord 18 is guided onto the building drum 20 by means of a thread feed device, generally indicated by the reference numeral 22, which consists of a traverse arm 24 that is reciprocally driven across the peripheral surface of drum 20 by a drive mechanism 26.

To serve as an adhesive surface for receiving and holding the thread 18 as it is being wrapped onto the drum 20, a thin sheet of uncured rubber 28 is wrapped around the peripheral surface of the building drum 20. The thin rubber sheet 28 can be held onto the building drum 20 in any number of ways, for example, vacuum, glue, mechanically clamped, or stretched on if a stiff polyethylene backing is bonded to the gum.

As is illustrated in FIG. 2, a series of zig-zag lines are laid on rubber sheet 28 by thread device 22 as it sweeps back and forth across building drum 20 which is rotating at a constant angular velocity. After each rotation of drum 20, an alignment device generally indicated by the reference numeral 30, which will be described hereinafter, advances the laying of thread 18 with respect to the rotation of drum 20 an incremental distance to provide a successive series of zig-zag lines 32 which are evenly and closely spaced to the previously laid line. The pitch of each segment of the zig-zag line can be selected according to the relationship:

$$P = \frac{2\pi R \pm S}{N_b} \quad \text{(Eq. 1)}$$

where:

R = radius of building drum 20
S = distance between cords or threads at edge of the breaker 32, i.e. the edge spacing
$N_b$ = any even integer indicating the number of divisions or pitches per revolution of drum 20

By laying a continuous series of closely spaced zig-zag lines on drum 20 until its peripheral surface 21 is covered, a two-ply breaker is constructed. If desired, the breaker can be constructed to have any even number of plies. The number of revolutions of drum 22 required to make a two-ply breaker would be:

$$\text{Revs.} = \frac{4\pi R}{N_b S} \quad \text{(Eq. 2)}$$

where the terms R and $N_b$ and S were defined above in connection with Equation 1.

As mentioned hereinbefore, an alignment device 30 advances the laying of zig-zag lines an incremental distance upon each rotation of drum 20. Alignment device 30 consists of pinwheel assemblies 34 and 36 rotatably mounted on either side of building drum 20. The pinwheel assemblies 34 and 36 have a plurality of equally spaced pins generally indicated by the reference numerals 38 and 40, that extend radially from the peripheral surface 42 and 44 of pinwheel assemblies 34 and 36, respectively.

The pinwheel assemblies 34 and 36 are mounted on a common drive shaft 50. As shown in FIG. 1, the drive shaft 50 is offset from the rotational axis of building drum 20 such that each of the pins 38 and pins 40 during every revolution of pinwheel assemblies 34 and 36, respectively, ride above the peripheral surface 21 of building drum 20 along a short arcuate segment of peripheral surface 21. In the embodiment shown in the drawings, the mid-point of this arcuate segment is the point where the free end 52 of traverse arm 24 intersects with the edges of collapsible building drum 20. However, the free end 52 could be positioned anywhere along the arcuate segment and get the same results.

The drive shaft 50 is driven by a mechanism to be described hereinafter at a speed relative to the speed of the building drum 20 such that one of the pins 38 or pins 40 crosses the arcuate path of free end 52 of traverse arm 24 immediately after it swings across the vertical plane formed by pins 38 or pins 40. Then as the free end 52 reverses its direction and swings back towards the middle of surface 21, the cord 18 is looped around either pins 38 or pins 40, depending on which side of the building drum the traverse arm is located. In order to form a breaker having a series of successive Z-shaped lines which are closely and evenly spaced at the edges of the breaker, it has been determined that the building drum 20 and pinwheels 34 and 36 should be rotated at an angular velocity relative to each other according to the following relationship:

$$W_{pw} = W_{bd} \frac{N_b}{N_{pw}} \pm \frac{S}{2\pi R} \quad \text{(Eq. 3)}$$

where:

$W_{pw}$ = angular velocity of pinwheels 34 and 36
$W_{bd}$ = angular velocity of building drum 20
$N_{pw}$ = number of divisions (pitches) in pinwheel assemblies 34 and 36
R = radius of the building drum 20
S = distance between cords or threads 32 at the edge of breaker (edge spacing)
$N_b$ = any even integer indicating the number of divisions or pitches in the breaker 32.

The pinwheel division ($N_{pw}$) is defined as the arc of the pinwheel subtended by two pins which are used to catch the thread 18 in succession. It is not necessary that the pins (38 or 40) are used in succession, for depending on the relationship of Equation 3 one or more pins might be skipped in each succeeding swing of traverse arm 24.

From the expression of Equation 3, it can be seen that the pinwheel assemblies 34 and 36 must be rotated at a higher angular velocity than building drum 20 by a factor which is the sum or difference of the number of divisions of the breaker divided by the number of divisions of the pinwheel assembly and an amount equal to one edge spacing divided by the mean circumference of the drum 20. This latter factor is responsible for advancing or retracting the pinwheel assemblies 34 and 36 one edge spacing with respect to the building drum 20 for each revolution of the building drum 20.

Although the pinwheel assemblies 34 and 36 are rotated at a higher angular velocity than the building drum 20, a point on the pinwheel assembly 34 and 36 can be made to follow a corresponding point on the building drum 20 almost exactly for a segment of each revolution. This can be done by selecting the diameter of the pinwheel assemblies such that their peripheral velocities are substantially the same as that of the building drum. This relationship can be defined by the following expression:

$$R_{pw} = \frac{W_{bd}}{W_{pw}} R \quad \text{(Eq. 4)}$$

where the terms were previously defined in Equation 3, except for $R_{pw}$ which represents the radius of the pinwheel assemblies 34 and 36.

It is for this reason that the sets of pins 38 and 40 can be used to position the cord 18 on the building drum 20 and hold it in position until it is stitched by a roller assembly (not illustrated). After stitching by the roller assembly, the pins 38 or 40 pulls itself from the cord 18 automatically as it swings away from the peripheral surface 21 of building drum 20.

The traverse arm 24 is pivotally mounted by a pivot block 54 (see FIG. 3) which rests on an L-shaped support member 53 that is a horizontal extension of vertical column member 55 (FIG. 1). To drive the free end 52 of traverse arm 24, a drive mechanism 26 is provided comprising a roller bearing 56 that rides in heart-shaped slot 58 of cam 60, which is driven eccentrically. The slot 58 is cam 60 has two constant velocity segments 62 interconnected by two acceleration segments 64. The constant velocity segments 62 are used to drive the traverse arm 24 across the building drum 20 in either direction and lay the cord 18 in a straight line path on the uncured rubber sheet 28. The constant acceleration segments 64 provide the means for rapidly reversing the direction of the free end 52 of traverse arm 24. If desired, the configuration of the slot 58 of cam member 50 be altered to lay the cord 18 in a path other than a straight line.

As best shown in FIG. 1, an eyelet element 66 projects downwardly from the free end 52 of traverse arm 24 to guide the thread 18 onto the uncured rubber sheet 28. It is important that the eyelet 66 be positioned a short distance above the peripheral surface 21 of drum 20 so that a short length of cord 18 will extend between the point of contact with the peripheral surface 21 and the point where it is wrapped around one of the pins 38 or 40 by the traverse arm 24. By having a short unsupported cord length, the thread 18 will be laid straight at the edge despite the deceleration, direction reversal and reacceleration of traverse arm 24 to form a distinct V edge. If this close spatial relationship between the feed hook eyelet 66 and the peripheral surface 21 were not maintained, large radii sized loops would be formed at the edges of breaker 32 due to the deceleration, direction reversal and reacceleration of the traverse arm at these ends.

All the driven elements of the breaker winding machine 10 are powered by motor 70. The motor 70 drives a jack-shaft 72 by means of an endless belt 74 coupled between the output shaft 76 of motor 70 and the drive wheel 78 coupled to the end of jack-shaft 72. Jack-shaft 72 is rotatably mounted by bearings (not shown) in an opening provided in a horizontal extension 79 of the frame member 16. The rotation of jack-shaft 72 drives timing belts 80 and 82 to rotate respectively the pinwheel assemblies 34, 36 and drum 20. Timing belt 80 wraps around a disc member 84 which is keyed to shaft 50. Timing belt 82 wraps around a sprocket 86 which drives drum 20 around hub 88 (FIG. 2). As can be seen by referring to FIG. 2, the offset drive shaft 50 is rotatably supported inside center hub 88 by means of bearings (not shown). The center hub 88 is (in dotted form) secured to the upper portion of frame member 16. Sprocket 86 rotates about hub 88 on bearings (not shown) to rotate drum 20.

The building drum 20 is of a conventional collapsible construction for breaker removal, and is adapted to be removed from center hub 88 in order to change the diameter of the breakers 32. When the diameter of the building drum 20 is changed, it is necessary to axially shift the pinwheel assemblies 34 and 36 and to radially reposition their pins 38 and 40, respectively.

To drive the drive mechanism 26, a cylindrical hub 90 is secured to the left end of shaft 50 (as viewed in FIG. 2). The driving mechanism 26 is driven positively from the pinwheel shaft 50 through timing belt 92, a right angle drive unit 94, extensible shaft 96 and pulley system 98. The extensible shaft 96 is provided so that the traverse arm 24 and traverse arm support 53 may be raised or lowered to correspond to various diameters of breakers 32.

In summary, by using a pair of pinwheel assemblies that are positioned and driven in a particular relationship to the building drum and traverse arm, as hereinbefore described, there is provided flexible ring-shaped breaker structure having a zig-zag pattern of uniform thickness and spacing. By disposing the feed hook on the end of the traverse arm a short distance from the drum's surface, the cord is laid in a straight line at the edge of the breaker despite the deceleration, direction reversal and reacceleration of the traverse arm.

I claim:
1. A breaker winding machine for forming annular bands from an endless thread onto a collapsible building drum having a rubber sheet carried on its peripheral surface comprising a building drum mounted on a first shaft, a pinwheel assembly mounted on either side of said drum on a second shaft which extends parallel to said first shaft, the diameter of said two pinwheel assemblies being smaller than the diameter of said building drum, at least one pin extending radially from the peripheral surface of said two pinwheel assemblies in equal space relationship and arranged in a plane perpendicular to the axis of said second shaft, a traverse arm pivotally mounted with one end disposed above the peripheral surface of said drum having a means for feeding the thread onto said drum, means for reciprocally driving said one end across the peripheral surface of said drum in an arcuate path whose length is slightly greater than the distance between corresponding pin members of said pinwheel assemblies, said second shaft being positioned relative to said first shaft such that said at least one pin projects above the peripheral surface of said drum for an arcuate segment which includes the intersection of said feed means on said one end of said traverse arm with said plane of said pins, and means for driving said first and second shafts at a speed relative to each other such that for each swing of said traverse arm one of said pin members extends above the peripheral surface of said drum immediately after said feed means crosses said intersection.

2. A breaker winding machine as defined in claim 1, wherein said first and second shafts are rotated relative to each other by the relationship:

$$W_{pw} = W_{bd}\frac{N_b}{N_{pw}} \pm \frac{S}{2\pi R} \qquad \text{(Eq. 3)}$$

where:

$W_{pw}$ = angular velocity of pinwheels 34 and 36
$W_{bd}$ = angular velocity of building drum 20
$N_{pw}$ = number of divisions (pitches) in pinwheel assemblies 34 and 36
$R$ = radius of the building drum 20
$S$ = distance between cords or threads 32 at the edge of breaker (edge spacing)
$N_b$ = any even integer indicating the number of divisions or pitches in the breaker 32

3. A breaker winding machine as defined in claim 1, wherein said means for feeding the thread onto said drum comprises an eye-hook that extends from said one end of said traverse arm and is disposed in close space relationship above the peripheral surface of said drum, whereby as the cord wraps around one of said pins only a short segment of cord extends between the eye-hook and said one pin to lay a straight V-line at the edge of the breaker being formed.

4. A breaker winding machine as defined in claim 1, wherein said reciprocally driving means comprises an eccentrically driven cam member and a guide member interposed between said cam member and said traverse arm, said cam member having a camming surface with two velocity segments interconnected by two acceleration segments, whereby said guide member bears against said camming surface to drive the said traverse arm at a constant speed across said drum in either direction and to decelerate, reverse speed and reaccelerate when said traverse arm is at either edge of said drum.

References Cited

UNITED STATES PATENTS

| | | | |
|---|---|---|---|
| 852,855 | 5/1907 | Sloper | 156—397 |
| 3,002,874 | 10/1961 | Lowe | 156—397 |
| 3,113,738 | 12/1963 | Vanzo | 156—397X |

BENJAMIN A. BORCHELT, Primary Examiner

S. C. BENTLEY, Assistant Examiner